Dec. 11, 1923.
F. F. FORSHEE
1,477,339
IMMERSION WATER HEATER
Filed Dec. 7, 1920
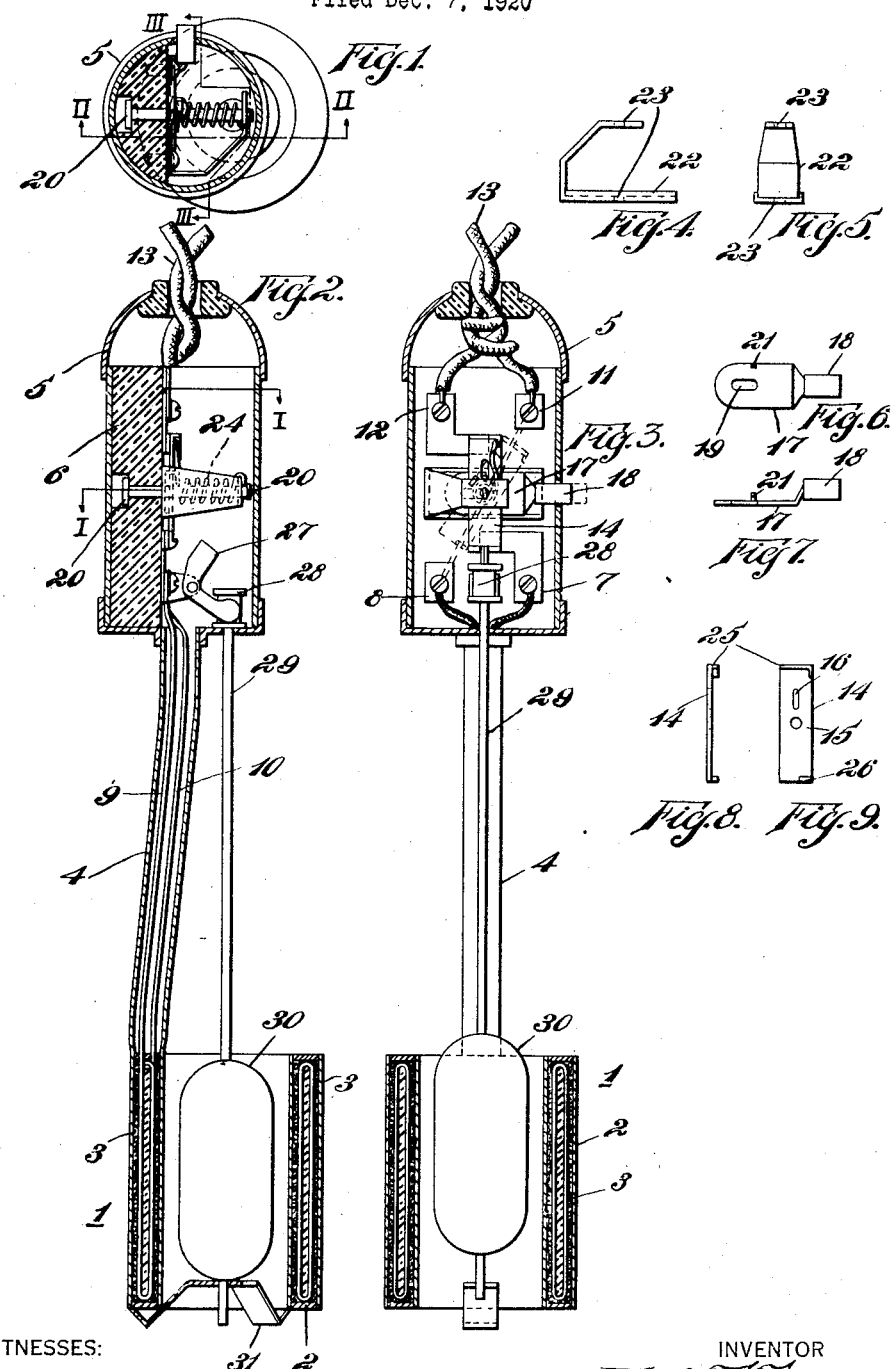
WITNESSES:
INVENTOR
ATTORNEY Patented Dec. 11, 1923.

1,477,339

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

IMMERSION WATER HEATER.

Application filed December 7, 1920. Serial No. 428,878.

*To all whom it may concern:*

Be it known that I, FRANK F. FORSHEE, a citizen of the United States, and a resident of Flint, in the county of Genesee and State of Michigan, have invented a new and useful Improvement in Immersion Water Heaters, of which the following is a specification.

My invention relates to electrically-heated apparatus and particularly to electric immersion heaters and it has for one of its objects to provide an electric immersion heater with automatic means for insuring that current will be supplied to the device only during its immersion and will be interrupted as soon as the device is withdrawn from the liquid.

Another object is to provide manually operated means for closing a switch, and float-controlled latching means for holding said switch, in its closed position.

In practicing my invention I provide an encased heating element, a casing secured to said heating element, a switch in said casing spring-biased to its open position, means for manually closing said switch, a latch for holding said switch in its closed position and a buoyant casing located in said heating element for actuating said latch.

In the single sheet of drawings,

Figure 1 is a view, in transverse section, on the line I—I of Fig. 2, of a device embodying my invention.

Fig. 2 is a view, in longitudinal section, on the line II—II of Fig. 1.

Fig. 3 is another view, in longitudinal section, on the line III—III of Fig. 1.

Figs. 4 and 5 are views, in side and in end elevation, respectively, of a part of the switch mechanism.

Figs. 6 and 7 are top plan and side elevation views, respectively, of another part of the switch mechanism, and Figs. 8 and 9 are side elevation and top plan views, respectively, of the switch blade.

A heating element 1 comprises a suitable resistor 2 and a water-tight enclosing casing 3. The heating element 1 may be of any desired contour, but is preferably made of substantially tubular form so as to obtain a relatively large heating effect in a relatively small space.

One end of a hollow stem member 4 is suitably secured to the heating element 1 and has a switch casing 5 attached to its other end. A block 6 of suitable insulating material is located inside of the casing 5 and has contact members 7 and 8 mounted thereon to which terminal wires 9 and 10 of the resistor 2 are electrically connected. The block 6 is provided also with terminal members 11 and 12, to which supply wires 13 are connected.

The terminals 7 and 12 are of substantially L-shape, the outer ends thereof being adapted to co-operate with, and be engaged by, a movable switch blade 14. The blade 14 is provided with a centrally located opening 15 and with a longitudinally extending slot 16 for a purpose to be hereinafter set forth.

The blade 14 is manually actuated to its circuit-closing position by means of a member 17 which is provided, at its outer end, with an insulating member 18. A longitudinally extending slot 19 is provided in the member 17 to permit of moving the member on a central pin or stud 20. A relatively small up-standing lug or boss 21 is provided on the member 17, which moves in the slot 16 in the member 14 to cause a turning movement of the latter on the pin 20.

A frame 22 of substantially U-shape is provided, each of the side parts having a substantially circular opening 23 therethrough to permit of mounting the frame on the pin 20. A spring 24 is provided on the pin 20, inside of the frame 22, and is so located that its lower end engages a small upstanding lug 25 at one end of the blade member 14. The bottom member of the frame 22 is of substantially channel section to permit of locating the actuating member 17 therein. The outer end of the pin 20 may be flattened to hold all of the co-operating parts in their proper operative positions.

A relatively small lug 26 is provided at the end of the blade member 14 opposite to the lug 25 to act as a stop member, in co-operation with a latch 27 of substantially L-shape. The lower member of the latch 27 is forked to engage a substantially cylindrical member 28 which is connected to the upper end of a rod 29, a float or buoyant member 30 being connected to its lower end. A member 31 is provided at the lower end of the casing 3 to hold the buoyant member 30 substantially coaxial with the heating element 1, while permitting free vertical movement therein.

If it is assumed that the heating element is not immersed in a fluid, the float 30 and the latch 27 will be in the positions indicated in Fig. 2. This permits the spring member 24 to actuate the switch blade 14 to its open circuit position, as indicated by the broken lines in Fig. 3.

If it is desired to close the switch, a lateral pressure upon the member 18 will cause the lug 21 to so move the blade 14 as to cause it to take the position indicated in Fig. 3 in full lines, thus connecting the contact terminals 12 and 7 and permitting the heating element to be energized.

If the heating element and the float are immersed in a fluid, the float occupies the position indicated in Fig. 3, thus causing the upper lug of the latch 27 to engage the lug 26 of the blade 14 and hold the switch in its closed position.

If the heating element and the float are removed from the fluid or if the fluid is evaporated, the float and the latch will move to the positions indicated in Fig. 2, thus permitting the spring 24 to quickly open the switch and thus interrupt the circuit.

It may be noted that the device embodying my invention provides an immersion heater in which the circuit is to be manually closed but is automatically and quickly opened in case the heater is removed from the fluid or in case the fluid is evaporated without possibility of damage to the heating element.

Various modifications may be made in the device embodying my invention without departing from the spirit and scope thereof, and I desire that only such limitations shall be placed thereon as are imposed by the prior art or are specifically set forth in the appended claims.

I claim as my invention:

1. An electric immersion apparatus comprising a heating element adapted to be immersed in a liquid, a quick-break switch therefor and a float-controlled latch for holding said switch in its closed position.

2. An electric immersion heater comprising a heating element adapted to be immersed in a liquid, an upwardly extending handle secured to said heating element, a casing secured to said handle, a quick-break switch in said casing biased to its open position, manual means outside of said casing for closing said switch and a float-controlled latch for holding said switch in its closed position when the heating element is immersed in the liquid.

3. An electric immersion heater comprising a substantially tubular heating element adapted to be immersed in a liquid, an upwardly extending handle secured to said element, a manually closable switch located in said casing and yieldingly biased toward its open position, a latch for holding said switch in its closed position, and a float located in said heating element and coaxial therewith and adapted to actuate said latch.

In testimony whereof, I have hereunto subscribed my name this 15th day of Nov., 1920.

FRANK F. FORSHEE.